(No Model.)
A. F. DUNTON.
SPRINKLING MACHINE.
No. 435,878. Patented Sept. 2, 1890.
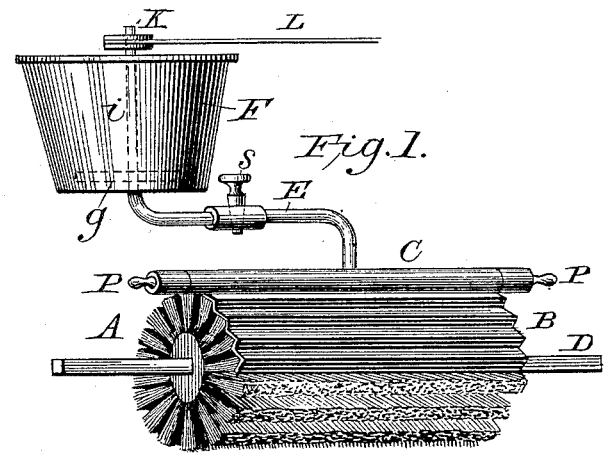
Fig. 1.
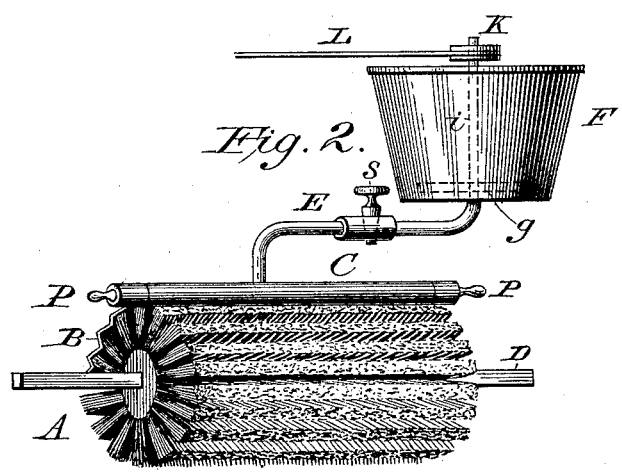
Fig. 2.
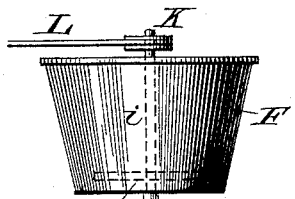
Fig. 3.
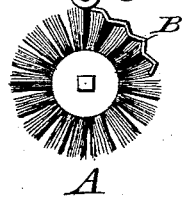
Witnesses:
A. T. Newman
Inventor.
Alvaro F. Dunton,
per
Martin Newman
Attorney

UNITED STATES PATENT OFFICE.

ALVARO F. DUNTON, OF EAGLE POINT, WISCONSIN.

SPRINKLING-MACHINE.

SPECIFICATION forming part of Letters Patent No. 435,878, dated September 2, 1890.

Application filed November 7, 1889. Serial No. 329,594. (No model.)

*To all whom it may concern:*

Be it known that I, ALVARO F. DUNTON, of Eagle Point, in the county of Chippewa and State of Wisconsin, have invented certain new and useful Improvements in Sprinkling-Machines; and I do hereby declare that the following is a full, clear, and exact description of the same.

This invention consists of a rotary circular brush revolving within and against a concave apron or shield, the top or upper side of which is provided with a longitudinal tube or chamber. The apron or shield mentioned may have a plain and smooth surface or it may be corrugated. The longitudinal tube or chamber mentioned is provided with a row of perforations in the direction of its length on its lower or under side, through which water or any other fluid intended to be sprinkled is fed to the rotary brush from a tank or reservoir suitably placed and through suitable pipes provided for that purpose. This arrangement distributes the fluid over the whole length of the brush, and the supply is regulated by a stop-cock in the feed-pipe connected with the supply tank or reservoir. Within this tank there may be provided a suitable agitator for the purpose of keeping the fluid properly mixed. As the brush revolves, the fluid is spread by the bristles of the brush in passing along the inner side of the concave apron, and this revolution is such that as the bristles constituting the brush leave the edge of the apron or shield farthest from the chamber the fluid is thrown off by their springing action in the form of a fine mist. In other words, the brush "spatters" the fluid by its spring action when charged with the fluid.

This invention is useful in sprinkling paris-green and water on potato-vines, and plaster and water and other similar mixtures where a small amount of fluid in proportion to the solid matter of the compound is desired to be reduced to a fine spray and made to cover a large space for the amount of material used. Where heavy mixtures are used, the corrugated form of the apron or shield is considered preferable.

In the accompanying drawings like letters of reference indicate like parts.

Figure 1 is a view in perspective of the rotary brush, shield, and perforated tube or chamber which embody the principal features of my invention. Fig. 2 is a perspective view showing opposite side of rotary brush and perforated chamber and the row of perforations in the under side of the chamber at the top of the brush. Fig. 3 is a transverse view showing the rotary brush, the concave apron or shield, the chamber, and the tank all in section.

A represents the rotary brush, which revolves within the apron or shield and distributes the mixture over its under surface. This brush carries the mixture past the edge of the apron, and by reason of the sudden release of that part of the brush it is caused to fly therefrom in the form of a fine spray.

B represents the apron or shield, and is shown in the drawings in the corrugated form, that form being deemed preferable.

C represents the longitudinal chamber, the office of which is to distribute the mixture along the whole length of the brush A through the perforations shown in the drawings at the top of the brush. At each end of the chamber is provided movable stoppers or plugs or pistons, (shown at P P,) by which the width of the sheet of the spray may be regulated.

D represents the axis of the brush A.

E represents the feed-pipe leading from the reservoir F to the chamber C, and is provided with a stop-cock, as shown at S.

An agitator, for the purpose of keeping the compound properly mixed, and a method of operating it, is shown in the drawings at the letters $i$, $g$, K, and L.

I am aware that a rotary brush or brushes have been used heretofore for sprinkling and spraying machines for spraying mixtures, and I do not claim the use of a rotary brush or brushes as my invention, except in substantially the manner hereinbefore described.

What I claim as my invention is as follows:

The combination, with the tank of a sprinkling-cart, of suitable distributing-passages and a rotary sprinkling-brush at the outlet thereof, and a shield partially covering the brush and bent several times toward the axle of the brush so as to form a series of ledges, whereby it engages the brushes, substantially as described.

ALVARO F. DUNTON.

Witnesses:
L. M. NEWMAN,
J. C. McLAREN.